2,970,818
MIXING APPARATUS

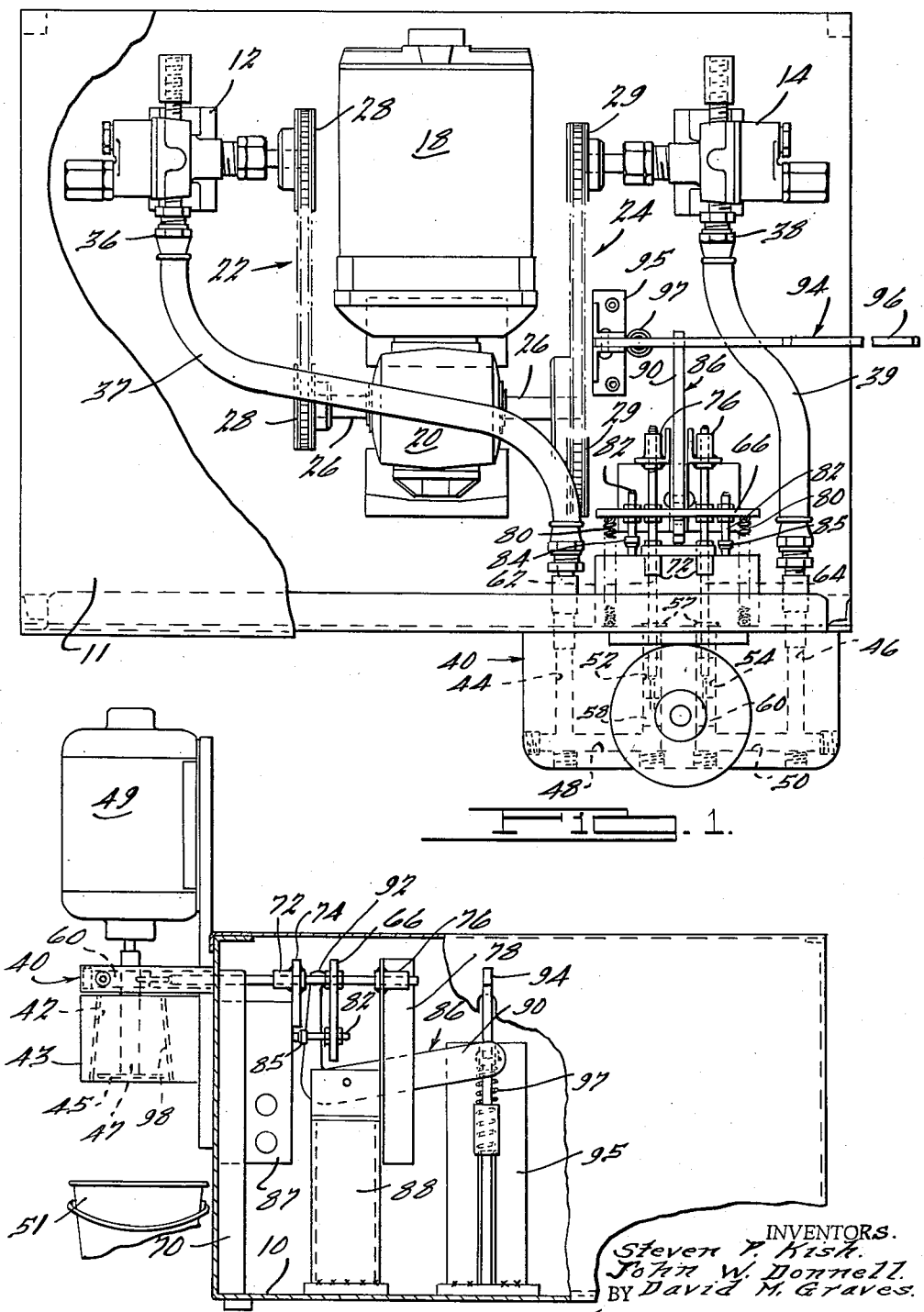

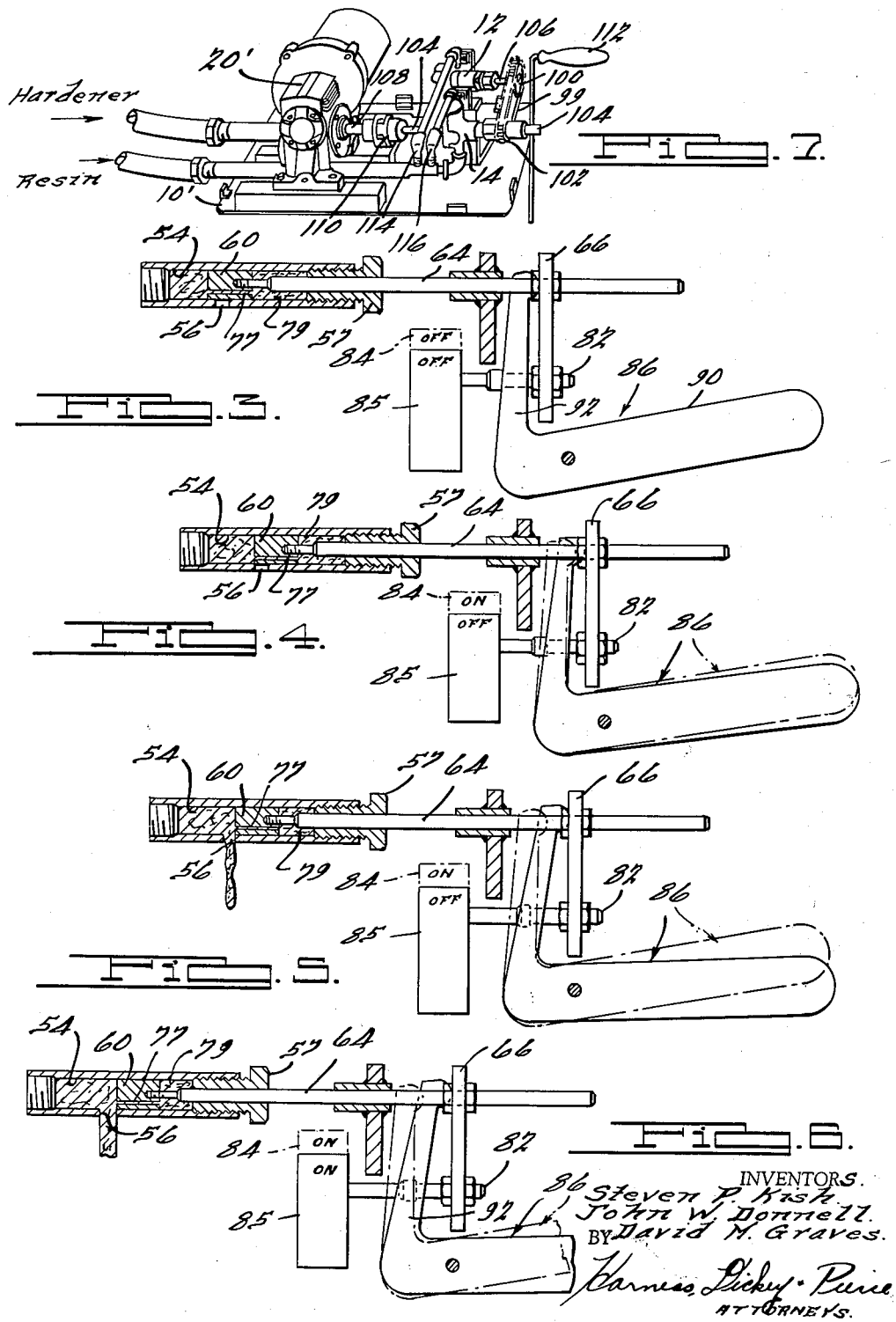

Steven P. Kish, Lansing, John W. Donnell, East Lansing, and Davis M. Graves, Lansing, Mich., assignors to Kish Industries, Inc., Lansing, Mich., a corporation of Michigan Filed Aug. 2, 1957, Ser. No. 676,017

3 Claims. (Cl. 259—8)

This invention relates to improved mixing apparatus for mixing viscous fluids, and more particularly to such apparatus especially adapted for mixing liquids that tend to solidify after they are mixed.

In low production plastic lay up and molding work, for example, it is desirable to provide a source of a self-hardening plastic such as a raw resin containing in intimate intermixture a predetermined proportion of a hardening agent such as a catalytic accelerator. The mixture of resin and hardening agent in a highly viscous, yet still liquid form may then be taken from the source, molded to form shaped bodies and allowed to harden, or cure. In this work, the mixture often must be made up in relatively small batches so that it will not harden and solidify before it can be worked to shape.

Accordingly, one important object of the present invention is to provide an improved mixing and dispensing apparatus for self-hardening materials.

Another object is to provide an improved apparatus for mixing a raw plastic material with a hardening agent in predetermined proportions, and dispensing the mixture as it is formed.

Another object is to provide improved apparatus for mixing a plastic material with a predetermined proportion of a hardening agent in which the plastic and the hardening agent are at all times maintained separate and apart from one another until the moment of their intermixture so that the mixed material does not solidify in the apparatus and clog it.

Another object is to provide an improved pump assembly for use in this type of mixing apparatus.

Another object is to provide an improved mixing device for mixing self-hardening materials, including a mixing chamber provided with a removable liner, which keeps the walls of the chamber free of the hardened material, and which may be discarded and replaced when it becomes loaded with hardened material.

Still another object is to provide an improved plastic mixing device including separate conduits for a liquid plastic and a liquid hardening agent, each one of the conduits having a separate discharge opening communicating with a mixing chamber, the device also including control means to control the flow of the plastic and the hardening agent into the chamber, and to control the operation of a mixing member disposed within the chamber to maintain the mixing member in a clean, unclogged condition at all times.

These and other objects are accomplished by the instant invention, one embodiment of which comprises a mixing device including a pair of positive displacement pumps mechanically coupled together to be driven at a predetermined displacement ratio. A raw plastic such as a resin monomer is fed into one of the pumps, and a hardening agent such as a catalytic accelerator is fed into the other one of the pumps, the capacities of and the driving ratio between the pumps being adjusted according to the proportion of hardening agent to resin desired in the ultimate mixture. The outlets of the pumps are connected to separate conduits which lead through separate, coordinated valves to separate discharge ports communicating with a mixing chamber. A spinner type mixing element is disposed within the chamber for thoroughly intermixing the materials discharged from the separate outlet ports. Control apparatus is provided for actuating the device and for automatically shutting off the various components in a predetermined timed sequence to maintain the mixing element clean and free of hardenable material at all times. The device is operable to dispense small or large quantities of mixed plastic and hardening agent upon demand, and does not become internally clogged or require excessive maintenance.

The invention will now be described in greater detail in connection with the accompanying drawings of which:

Figure 1 is a plan view of a complete mixing device according to the invention, with the housing thereof partly broken away;

Fig. 2 is a side elevational view, partly in section of the assembly shown in Fig. 1;

Fig. 3 is a somewhat schematic, cross-sectional view of the control portion of the device shown in the preceding figures, showing the control portion of its OFF, or closed position;

Fig. 4 is a view generally similar to the view of Fig. 3 showing the control portion shortly after the start of its travel toward the ON, or open position;

Fig. 5 is a view generally similar to the views of Figs. 3 and 4, but showing the control portion in another position;

Fig. 6 is a view generally similar to the views of Figs. 3, 4 and 5 showing the control portion in its fully ON, or open position; and Fig. 7 is a perspective view of an alternative pump assembly for use in the device shown in Figs. 1 and 2.

Referring now to the drawings, the device shown therein represents a preferred embodiment of the invention and is especially adapted for mixing a relatively viscous, yet liquid resin with a hardening agent and dispensing the mixture upon demand. The component parts of the device, which may all be mounted upon a supporting base 10, include a pair of positive displacement pumps 12 and 14, which may be, for example, gear pumps, and which together with other parts of the device may be enclosed within a housing 11. The pumps 12 and 14 are arranged to be driven at a predetermined speed relationship by an electric motor 18 through a speed reducer 20. As shown in Fig. 1, the two pumps 12 and 14 are driven through chain and sprocket drives 22 and 24 from opposite ends of the double ended output shaft 26 of the speed reducer 20. The relative sizes of the sprockets 28 and 29 are selected according to the proportion of resin to hardener desired in the mixture to be dispensed in view of the displacement rates of the two pumps. Typically, the mixture will include a relatively large proportion of resin and a relatively small proportion of hardener, so if the pumps 12 and 14 are identical to each other the resin pump 14 is arranged to be driven faster than the hardener pump 12 by a factor equal to the desired resin-hardener proportion.

If the resin and the hardener are sufficiently fluid, they may be gravity fed to the pumps 12 and 14, or, alternatively, if they are relatively viscous, it may be desirable to provide positive air pressure in the storage tanks (not shown) to insure delivery of the resin and the hardener to the pumps 12 and 14 at the requisite rates.

The pump outlets 36 and 38 are connected through hoses 37 and 39 to a manifold 40 having symmetrically arranged passageways, to be described in detail hereinafter, communicating with a mixing chamber 42 defined by a body 43 supported beneath the manifold. The manifold 40 defines a pair of inlet passageways 44 and 46 to which the hoses 37 and 39 are connected. These inlet passageways 44 and 46 open into transverse passageways 48 and 50, which in turn lead to outlet passageways 52 and 54, respectively, provided with outlet ports 56 (Figs. 4–7) extending through the bottom of the manifold 40.

Separate valve pistons 58 and 60 are slidably fitted within the outlet pasageways 52 and 54, respectively, in bore-fitting engagement therewith, to open and close the ports 56. These pistons 58 and 60 are controlled by a pair of ganged piston rods 62 and 64 to which they are rigidly attached, and which are slidably sealed through end plugs 57 which close the terminal ends of the outlet passageways 52 and 54. The piston rods 62 and 64 are supported exteriorly of the manifold 40 within fixed bushings 72 and 76, two axially spaced bushings being provided for each one of the rods to hold them in alignment with the passageways 52 and 54. The rods 62 and 64 are yoked together for synchronous travel by a plate 66 rigidly secured to the rods between the bushings 72 and 76. This plate 66 carries a pair of studs 82 positioned to actuate a pair of limit switches 84 and 85 to control the energization of the pump motor 18 and a mixing motor 49. The plate 66, together with the rods 62 and 64, is urged forwardly by a pair of tension springs 80 connected between the plate 66 and the forward wall of the housing 11.

The outlet ports 56 are closed when the pistons 58 and 60 are fully advanced to the position shown in Fig. 3 and are opened as the pistons are retracted. The rate of travel of the pistons 58 and 60 within the passageways 52 and 54 is limited by bleed passageways 77 extending axially through the pistons 58 and 60 and opening at both ends thereof. The space 79 between the piston 58 or 60 and the end plug 57 is completely enclosed except for the bleed passageway 77, and fluid displaced from or entering this space 79 during movement of the piston 58 or 60 must pass through the passageway 77, the diameter of which is selected in view of the viscosity of the resin or hardener and the strength of the springs 80 to control the operational speed of the pistons 58 and 60, especially during their closing travel.

Resin and hardener discharged through the outlet ports 56 fall into a mixing chamber 42 defined by a body member 43 supported directly beneath the manifold 40. The resin and hardener are intimately intermixed in this chamber 42 by a spinner type mixing element 45 supported near the lower end of the chamber 42 and driven through a shaft 47 by an electric motor 49 mounted above the manifold 40. Any desired receptacle may be provided beneath the body member 43 to receive mixed resin and hardener discharged from the chamber 42. The receptacle may be a simple bucket 51, as illustrated, or a spray gun cup, or even a slush mold (not shown) for casting.

The piston rods 62 and 64 may be driven rearwardly by depressing the exteriorly projecting handle portion 96 of a bar 94, which is pivoted within the housing 11 upon a fixed support 95. The bar 94 is spring-biased toward the upper limit of its travel by a compresion coil spring 97 mounted beneath it. The bar 94 extends across and abuttingly engages one arm 90 of a bell crank 86 which is pivoted upon a fixed support 88 in the housing 11. The other arm 92 of the bell crank extends upwardly and abuttingly engages the forward side of the plate 66, so that when the handle 96 is depressed the bar 94 swings the bell crank 86 in a clockwise direction, as viewed in Figs. 3–6, to drive the plate 66 rearwardly against the urging of the springs 80, thereby opening the outlet ports 56. When the handle 96 is released, the spring 97 drives the arm 94 upwardly out of engagement with the bell crank 86, and the piston rods 62 and 64 are driven forwardly to close the ports 56 by the tension springs 80, which also act to return the bell crank 86 to its original position.

A pair of limit switches 84 and 85 of the spring-biased, normally open type are mounted upon a fixed bracket 87 near the front wall of the housing 11 and positioned to be actuated by the adjustable lugs 82 fixed to the plate 66. These limit switches 84 and 85 are connected in any appropriate circuits to control the energization of the gear pump drive motor 18 and of the spinner drive motor 49, respectively. In this description, it will be assumed that the left-hand limit switch 84, as viewed in Fig. 2 is connected to control the operation of the spinner motor 49, and that the right-hand limit switch 85 is connected to control the operation of the pump drive motor 18. The physical positions of the two limit switches are not critical in the practice of the invention, but the timing of their opening and closing with respect to the travel of the piston rods 62 and 64 is critical for optimum operation. This timing may be adjusted by changing the positions of the lugs 82 in the plate 66.

As shown schematically in Figs. 3–6, which illustrate successive positions of the bell crank 86 and the piston rods 62 and 64 during opening of the ports 56, in the first position (Fig. 3) the ports 56 are fully closed and both of the switches 84 and 85 are actuated and held open so that the motors 18 and 49 are de-energized. This is the idle, or waiting condition of the device.

When it is desired to operate the device to dispense mixed resin and hardener, the handle 96 is depressed, rotating the bell crank 86. When the bell crank 86 reaches the position illustrated in Fig. 4, the first limit switch 84 is closed, energizing the spinner motor 49 before the ports 56 are opened, and keeping it energized during the remaining opening travel of the bell crank 86. When the ports 56 are fully opened, as shown in Figs. 5 and 6, the motor pump switch 84 is closed to energize the pump motor 18 to pump resin and hardener through the ports 56 into the mixing chamber 42 where they are thoroughly intermixed by the spinner element 45 and then drop out of the chamber 42 into the receptacle 51.

During discharge of resin and hardener from the ports 56 into the mixing chamber 42, the spinner element 45 and the walls of the chamber 42 become relatively heavily coated with the resin and hardener mixture. According to the present invention, a removable, disposable liner, such as a tapered paper tube 98, is press-fitted within the chamber 42 to keep the resin mixture from contacting and adhering to the walls of the chamber. The resin that adheres to the paper liner 98 and fails to drain therefrom may be readily removed from the chamber merely by removing the liner itself and discarding it.

It is also important in the operation of resin mixing apparatus of this type to keep the spinner element 45 relatively clear of solidified resin, and this is accomplished according to the present invention by the timing of the control mechanism, including the travel of the piston rods 62 and 64 and the timed actuation of the limit switches 84 and 85.

After the device has been operated for a time to dispense resin and hardener mixture, all that need be done to turn off the device to stop delivery of the mixture and return the device to its idle, or waiting condition is to release the handle 96. This allows the arm 94 to be driven upwardly immediately by the spring 97, and allows the plate 66 together with the piston rods 62 and 64 and the bell crank 86 to be retracted by the springs 80. The speed of retraction of the plate 66 is limited by the action of the bleed passageways 77 in the pistons 58 and 60 which, as hereinabove described, are sized in accordance with the viscosity of the materials and the strength of the springs 80 to limit the rate at which the plate 66 and the associated parts are advanced by the springs 80.

The first step in the shutting-off operation of the apparatus is shown in Figs. 6 and 5, Fig. 6 showing the apparatus in its fully open position with both the pump switch 85 and the spinner switch 49 released to their normally closed positions and the ports 56 fully opened. When, now the handle 96 is released, the springs 80 are free to drive the plate 66 forwardly together with the piston rods 62 and 64. As soon as the plate 66 is driven only slightly forwardly, the switch 85 is actuated, that is, it is opened by the stud 82 to de-energize the pump motor 18 and to stop positive delivery of resin and hardener into the passageways 52 and 54. Small quantities of the resin and hardener may, however, continue to be discharged from the ports 56 on a pressure reduction and leakage basis.

The plate 66 continues to travel forwardly at a relatively slow rate as controlled by the bleed passageways 77. The pump motor 18 remains de-energized and the spinner motor 49 remains energized during the closing of the ports 56 until after the ports 56 are substantially fully closed, as shown in Fig. 4. During this time, the spinner throws off its accumulation of mixed resin and hardener by centrifugal action. The spinner motor 49 continues to operate even after the ports 56 are fully closed, until it is de-energized by actuation of the switch 84, as illustrated in Fig. 3, when the piston rods 62 and 64 with the plate 66 are almost fully advanced. Thus, ample time is provided for substantially complete removal of resin and hardener from the spinner element by centrifugal action. When the ports 56 are closed, the device is in a stand-by condition, the resin and the hardener being contained within separate passageways within the manifold 40 in an unmixed condition, so that there is no tendency for hardening or solidification of the resin, and the apparatus is always ready to mix and dispense resin-hardener mixture upon demand.

An alternative arrangement for the pumps 12 and 14 is shown in Fig. 7, and is preferred in many instances since it provides for alternative manual operation of the pumps 12 and 14 for dispensing very small quantities of mixed resin and hardeners. In this arrangement, the two pumps 12 and 14 are mounted side by side on a base 10' and directly coupled to each other by a single chain 99 trained over sprockets 100 and 102 mounted on the drive shafts 104 and 106 of the two pumps. The sizes of the sprockets 100 and 102 are selected to provide the desired speed ratio between the pumps 12 and 14 according to the mixture proportions. The shaft 104 of one of the pumps, in this case of the resin pump 14, is extended rearwardly and coupled to the single ended output shaft 108 of the speed reducer 20' through a clutch 110. The forward end of this pump drive shaft 104 carries a removable hand crank 112, so that when the clutch 110 is released the pumps 12 and 14 may be hand driven for more precise control of the output of the device. The pump outlets 114 and 116, as in the embodiment shown in Figs. 1 and 2, are connected by hoses, or appropriate rigid conduits (not shown) to the manifold 40 for operation according to the hereinabove described principles.

What is claimed is:

1. Apparatus for mixing a liquid resin with a liquid hardening agent comprising a pair of positive displacement pumps linked together for synchronous drive, power actuated means for driving said pumps, separate conduits connected to the outlets of said pumps, said conduits having separate outlet ports for the discharge of said resin and said hardening agent, valve pistons slidably fitted within said conduits and operable to open and close said outlet ports, and control means for driving said pistons in said conduits to open and close said outlet ports and for energizing and de-energizing said power actuated pump driving means in timed relationship to the travel of said pistons, and said control means including a fluid flow restricting arrangement to limit the rate of travel of said pistons.

2. Apparatus for mixing a liquid resin with a liquid hardening agent comprising a pair of positive displacement pumps coupled together for drive at a predetermined speed ratio relative to each other, a motor for driving said pumps, a body member defining a mixing chamber having an outlet at the lower end thereof, separate conduits connecting the outlets of said pumps to said mixing chamber and opening at separate ports at the upper end thereof, a rotatable mixing element disposed within said chamber for intermixing materials discharged from said separate ports, a motor for driving said mixing element, valve pistons slidably fitted within said conduits and operable to open and close said outlet ports, means for urging said valve pistons constantly toward the position in which they close said outlet ports, means for driving said pistons in their opening direction against the urging of said urging means to open said ports, the ends of said conduits toward which said pistons are driven during opening of said ports being closed, each one of said pistons defining a generally axially extending flow-limiting passageway for limiting the speed with which said pistons close said ports in response to said urging means, and control means actuatable by said pistons during their travel for energizing and de-energizing said pump motor and said mixing motor in predetermined timed relationship to the travel of said pistons.

3. Apparatus for mixing a liquid resin with a liquid hardening agent comprising a pair of positive displacement pumps coupled together for drive at a predetermined speed ratio relative to each other, a motor for driving said pumps, a manifold defining separate passageways each having an inlet and an outlet port, conduits connecting the outlets of said pumps separately to the inlet ports of said manifold passageways, a body member mounted adjacent to said manifold and defining a chamber positioned to receive materials discharged from said outlet ports of said manifold passageways, a rotatable mixing member disposed within said chamber for intermixing materials discharged therein from said manifold, a mixing motor for driving said mixing member, the ends of said manifold passageways opposite from the inlet ends thereof being closed, valve pistons slidably fitted in bore fitting relationship within said passageways adjacent to the closed ends thereof and operable to open and close said outlet ports, said outlet ports and said pistons being positioned with respect to each other so that travel of said pistons towards said closed ends of said passageways opens said outlet ports and permits flow of fluid through said passageways and said outlet ports into said chamber, each one of said pistons defining a flow limiting generally axially extending passageway effective to retard the travel of said pistons in said passageways when said passageways are filled with a liquid, biasing means for urging said pistons toward their outlet port closing positions, manually operatable means for driving said pistons against the urging of said biasing means to open said outlet ports, switching means for energizing and de-energizing said pump motor and said mixing motor, a switch actuating member mounted for travel with said pistons and effective to actuate said switching means to energize and de-energize said pump motor and said mixing motor in timed relationship with the travel of said pistons, said switch actuating member and said switching means being adjustable to de-energize said mixing motor only when said outlet ports are substantially fully closed and to energize said pump motor only when said outlet ports are substantially fully open, said flow limiting piston passageways being of a size to limit the closing speed of said pistons sufficiently to permit said mixing element to clean itself by centrifugal action between the time that said pump motor is de-energized and the time that said mixing motor is de-energized during the closing travel of said pistons.

References Cited in the file of this patent

UNITED STATES PATENTS

| 1,182,967 | Bowser | May 16, 1916 |
|---|---|---|
| 1,941,808 | McConnaughay | Jan. 2, 1934 |
| 2,564,852 | Mason et al. | Aug. 21, 1951 |
| 2,638,847 | McGowan | May 19, 1953 |
| 2,782,012 | Coyne et al. | Feb. 19, 1957 |
| 2,805,051 | Miller | Sept. 3, 1957 |
| 2,847,196 | Franklin et al. | Aug. 12, 1958 |
| 2,905,449 | Belk et al. | Sept. 22, 1959 |

FOREIGN PATENTS

| 191,288 | Germany | Nov. 7, 1907 |